United States Patent [19]

Herleth

[11] 4,171,111

[45] Oct. 16, 1979

[54] DRIVE MECHANISM FOR A TAPE RECORDER

[75] Inventor: Karl Herleth, Munich, Fed. Rep. of Germany

[73] Assignee: Firma Magnetronic Gesellschaft fur Elektronisch-Mechanisch Gerate mbH & Co. Entwicklungs KG, Munich, Fed. Rep. of Germany

[21] Appl. No.: 857,288

[22] Filed: Dec. 5, 1977

[51] Int. Cl.² ............................................. G03B 1/04
[52] U.S. Cl. .................................... 242/201; 242/67.4
[58] Field of Search ............... 242/192, 200, 201, 208, 242/67.4; 360/90

[56] References Cited

U.S. PATENT DOCUMENTS 3,587,997  6/1971  Wood ................................. 242/201
3,813,690  5/1974  Oka ..................................... 360/90

Primary Examiner—Leonard D. Christian

[57] ABSTRACT

The spools of a tape recorder are rotated to wind the tape in one direction or the other using a single motor. A reversible lever carries two friction wheels, one on either side of its pivot, and a band runs round these wheels and a driving pulley on the axis of the motor. The friction wheels are each mounted close to one of the spools. The lever is mounted so that it can pivot on its axis with less friction than there is in the bearings of the friction wheels, so that when the band reverses its direction of movement, the lever pivots to bring a different one of the friction wheels to bear against its respective spool, whereupon that spool is driven by friction between it and the friction wheel.

7 Claims, 5 Drawing Figures

DRIVE MECHANISM FOR A TAPE RECORDER

FIELD OF THE INVENTION

The invention relates to a drive mechanism for magnetic tape apparatus, in particular cassette tape recorders, with their own winding motors.

BACKGROUND OF THE INVENTION

Such driving mechanisms are described in the German patent application P 26 22 438.4 of May 20, 1976.

Therein a motor is rigidly connected to the driving pinion, a single toothed intermediate wheel is provided which is in continuous engagement with the pinion, which is mounted for limited movement in its plane on a circular path around the motor shaft and in the two end positions meshes with a respective one of the gear wheels of the winding plates. In this case the intermediate wheel is preferably decelerated in such a manner that after reversal of the motor its construction permits it to be displaced initially in a substantially translatory manner as far as stand-still engagement with one of the gear wheels of the winding plates. The known construction has stood the test excellently.

SUMMARY OF THE INVENTION

A conventional tape recorder is usually provided with a pair of winding plates, a capstan drive and tape drive mechanisms, with a single motor for driving both the capstan and either one of the winding plates. In accordance with the present invention, the improvement provides for the tape drive mechanism to have its own separate winding motor for selectively driving one of the winding plates in one direction and the other in the opposite direction. The mechanism is also provided with a driving pulley rotated about its axis by the motor, a reversible lever freely pivoted about an axis parallel to the axis of rotation of the driving pulley, two friction wheels mounted on the lever, one on each side of the pivot axis and a belt running around the motor driven driving pulley and the two friction wheels, and driving the friction wheels, the outer peripheral surface of the belt contacting one or other of the winding plates and driving the contacted plate by virtue of the friction between the belt and the spindle.

Preferably the bearing friction at the friction wheels (which is adjustable) is greater than the bearing friction at the reversible lever.

Advantageously at least one slipping clutch for decelerating the friction wheels is provided between the reversible lever and the underside of a friction wheel.

Alternatively, at least one magnetic friction clutch may be interposed between friction wheel and the reversible lever.

Advantageously the bearing pin of the reversible lever is disposed centrally above an imaginary line connecting the axes of the friction wheels.

In the older construction an intermediate wheel is required in addition to a rocker member. The rocker member must have two bearings, and precise adjustment and assembly, i.e. more accurate production, is necessary, since all the drive-transmitting wheels are gear wheels. In the invention, only friction-driven wheels are required in addition to the reversible lever and the belt. The assembly is obviously extremely simply. Highly quiet running is attained as a consequence of the friction between rubber and rubber. Servicing is simple. Worn parts are simply and rapidly replaced.

The construction is robust. The wheels may be produced from a synthetic resin with low production precision. The bearing is simple, since only one pivot point is present. The belt drive has a self-tensioning effect, i.e. it exhibits a servo effect. Due to the deceleration, a power amplification and as a consequence of the latter a self-wedging effect is produced. The squeezing pressure is increased proportional to the torque transmitted.

Preferably two slipping clutches are provided, one at each friction wheel. However, the invention still works with only one slipping clutch. It is only necessary that the friction of the slipping clutch be greater than the bearing pin friction. This is attained in that the frictioj ob for example the felt employed as a slipping clutch is greater than the friction at the lever bearing pin.

Varied belt forms can be used, for example flat belts, including flat belts constructed on the inside as toothed belts, round belts etc.

The friction of the slipping clutch may be adjusted, for example by spring pressure. The invention may be applied to horizontal operation as well as vertical operation. With the invention, a direct or indirect capstan drive by way of a separate motor is possible.

Further features and advantages of the invention will be apparent from the following description of one embodiment of the invention which is now to be discussed in detail with reference to the accompanying drawings,

DESCRIPTION OF THE PREFERRED EMBODIMENT

Figure 1:
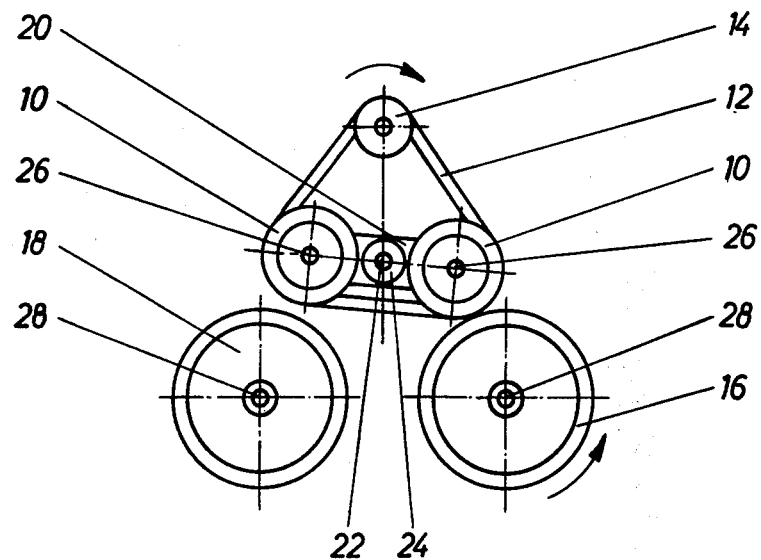
FIG. 1 is a diagrammatic view from above of a driving mechanism operating in one direction.
Figure 2:
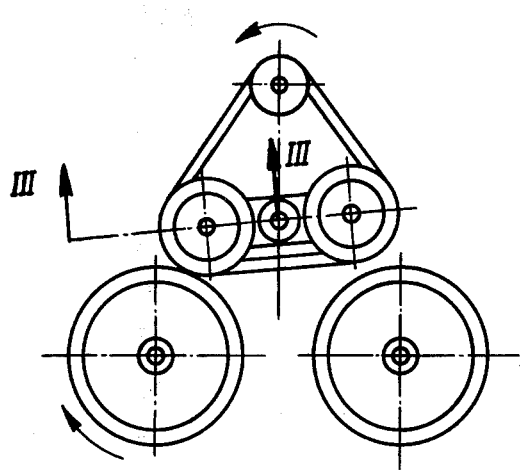
FIG. 2 is a diagrammatic view from above of the mechanism operating in the opposite direction.

In FIGS. 1 and 2 the driving motor is located under the driving pulley 14. By means of the belt 12 which may be, for example, a V-belt the driving pulley 14 drives the friction wheels 10 which are rotatably mounted on a reversible lever 20. The reversible lever 20 itself is mounted on a bearing pin 22 by means of a bearing sleeve 24. In this case the bearing sleeve 24 is securely riveted to the reversible lever 20. The shaft of the bearing pin 22 is rigidly seated on a chassis of the machine.

Upon reversal of the driving motor the driving wheel starts rotating in the opposite direction. Since the friction in the bearings of the friction wheels 10 is greater than the bearing friction of the reversible lever, the lever 20 swings around the bearing pin 22, while the belt 12 drives the friction wheels 10 around their shafts 26. The arrangement therefore moves from the position shown in FIG. 1, where the spindle or reel plate 16 is driven anti-clockwise, to the position shown in FIG. 2, where the spindle or plate 18 is driven clockwise, by friction between the outer surface of belt 12 and the periphery of plate 18.

Figure 3:
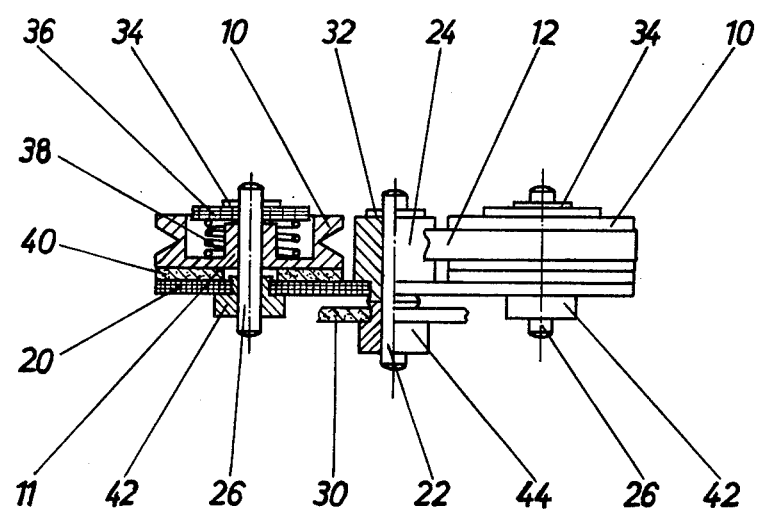
FIG. 3 is a section on the line III—III in FIG. 2.

FIG. 3 which is a section on the line III—III in FIG. 2 permits the construction of the device to be seen more clearly. It may be clearly seen how the bearing sleeve 24 is riveted to the reversible lever 20, and how the bearing shaft 22 is seated rigidly on the chassis 44. The bearing sleeve is secured on the shaft 22 by the locking ring 32. The left-hand friction wheel 10 is shown in section in the Figure. Its periphery has a V-groove for receiving a V-belt. It may be seen clearly how a friction-producing felt disc 40 is arranged underneath the hub 11 of the wheel 10. In this case the friction wheel 10 is loaded by a helical spring which is covered by a slide disc 36 in an adjustable manner and is secured on the stationary bearing shaft 26 by a locking ring. Obviously in place of the helical compression spring 38 any other spring may be employed, for example a plate spring. The connection between the stationary shaft 26 and the reversible lever 20 is ensured by a rivet bush 42.

Figure 4:
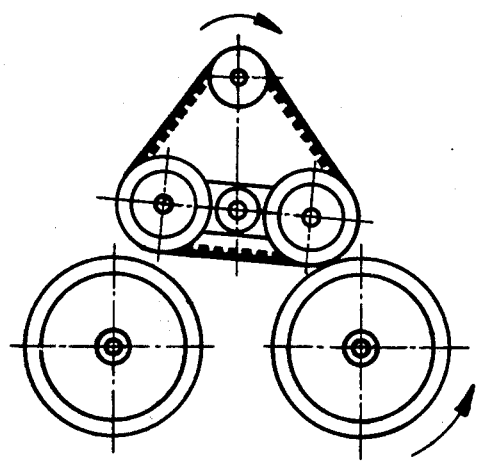
FIG. 4 is a diagrammatic view of FIG. 4 illustrating a portion of the toothed belt running around a toothed friction wheel.

FIG. 4 illustrates a different embodiment of the invention including a drive belt which is toothed on the inside and runs around the driving pulley (14) and the two friction wheels (10).

Figure 5:
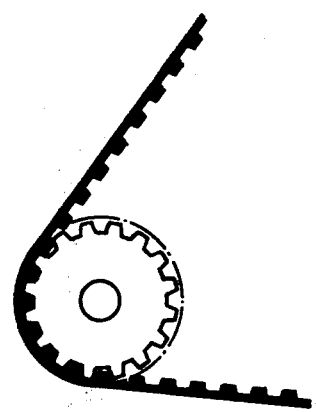

Another embodiment, as shown in FIG. 5, provides for the friction wheels (10) to be toothed on the inside and to be driven by a belt which is also toothed on the inside.

In operation, when, for example, the one winding plate 16 has wound in the one direction and then the other winding plate 18 is to wind (rewind), it is merely necessary to reverse the electrical polarity of the motor. The drive belt disc 14 drives then the belt 12 in the other direction. Since the bearing friction at the friction wheels is greater than the bearing friction of the reversible lever pivot pin 22, the control lever 20 is swung round and the connection between the friction wheel 10 previously in engagement and the winding plate 16 is cancelled. After the termination of the swinging process the other friction wheel 10 or the belt comes into contact with the other winding plate 18. Owing to the friction between the outside of the belt and the friction material of the respective winding plate, the other winding plate 18 is driven in the opposite direction from the previous winding plate 16. The pressure applying force between the friction wheel and the winding plate is further increased at higher torques.

Since no gear wheels as in German Application No. P 26 22 438.4 of May 20, 1976 are employed, the running quietness is quite important. In practice, the belt drive readjusts itself in practice upon wear or assembly inaccuracies.

Thus only a single transmission element, namely the (V—) belt, which runs over the two friction wheels mounted on the reversible lever, is present between the driving belt disc and the winding plate.

Compared with the driving mechanisms commercially available, there exists the further advantage that separate coupling devices for the switching device etc. may be omitted. Any reversible motor is suitable, for example a direct current motor with collector, which has two running directions.

I claim:

1. In a magnetic tape recorder of the type having two winding plates, a capstan drive and tape drive mechanisms, with a single motor for driving the capstan, as well as the winding plates, the improvement which comprises:

the tape drive mechanism having a separate winding motor for selectively driving one of the winding plates in one direction, and the other one in the opposite direction thereof;

a driving pulley disposed above the winding motor, and rotated by the same about its axis;

a reversible lever freely pivoted about an axis parallel to the axis of rotation of the driving pulley;

two friction wheels mounted on the lever, one on each side of the pivot axis of the lever; and a toothed belt running around the driving pulley and the two friction wheels for selectively engaging and driving either one of the winding plates, such that the torque generated by the winding motor is directly transmitted through the belt to either one of the winding plates.

2. The improvement according to claim 1, in which the outer peripheral surface of the belt selectively engages and drives one or the other of the two winding plates by virtue of the friction between the belt and each one of the winding plates.

3. The improvement according to claim 1, further comprising a slipping clutch for increasing the friction between the reversible lever and one or both of the friction wheels.

4. The improvement according to claim 1, in which the belt is toothed on the side thereof contacting the friction wheels.

5. The improvement according to claim 1, in which the peripheries of the winding plates have friction promoting surfaces for engaging the belt.

6. The improvement according to claim 1, further comprising a bearing pin disposed centrally along one imaginary line connecting the axes of the friction wheels, and the reversible lever being pivoted on the bearing pin, and having only one pivoting point.

7. The improvement according to claim 1, in which the belt is the only transmission element for directly transmitting the torque to one of the winding plates.

* * * * *